May 9, 1961 L. R. KOLLER 2,983,816
LUMINESCENT SCREENS AND THE PRODUCTION THEREOF
Filed March 26, 1958
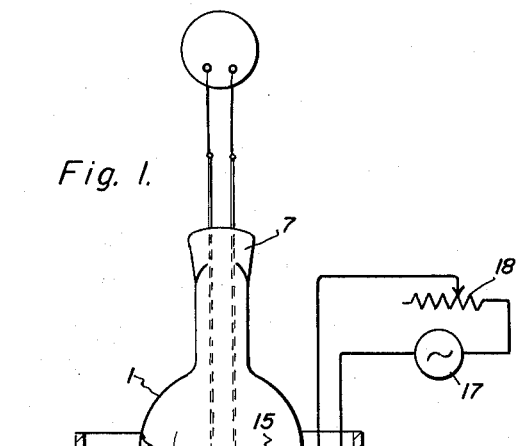
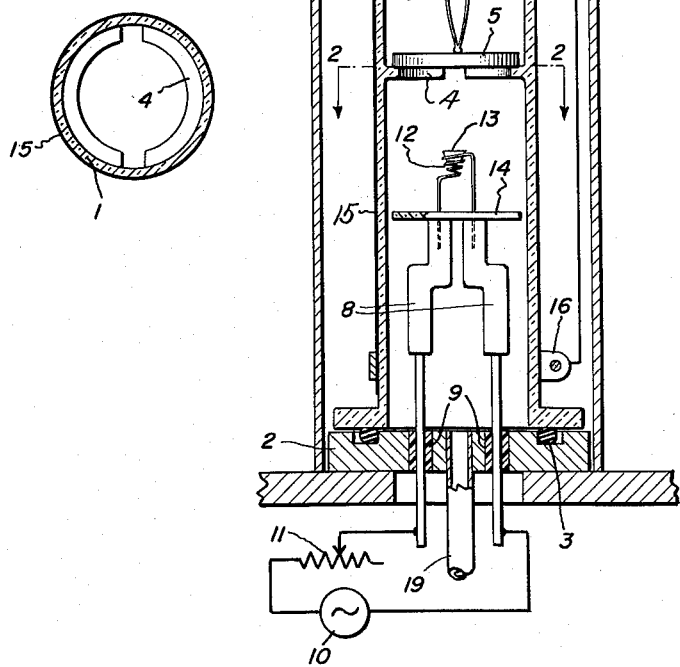
Inventor:
Lewis R. Koller,
by John F. Ahern
His Attorney.

United States Patent Office 2,983,816
Patented May 9, 1961

2,983,816
LUMINESCENT SCREENS AND THE PRODUCTION THEREOF

Lewis R. Koller, Schenectady, N.Y., assignor to General Electric Company, a corporation of New York Filed Mar. 26, 1958, Ser. No. 724,181

19 Claims. (Cl. 250—80)

The present invention relates to luminescent screens formed upon vitreous substrates by a chemical reaction therewith.

In the luminescence arts, as for example, the cathode ray tube art, luminescent screens are quite frequently formed by the deposition, upon a vitreous substrate, of a film of a luminescent phosphor. Phosphor films, or layers, may be so formed by liquid settling, silk screening, by the chemical reaction of two or more vapors in the vicinity of the substrate, or by vacuum evaporation.

Of the many techniques available for the formation of luminescent screens, the vacuum evaporation method appears to hold the most promise. This is due to many reasons, among which are the ease with which films may be formed in a short time, the ease with which uniform thin films may be formed and the fact that evaporated films are transparent and homogeneous. This latter characteristic enables evaporated films to be free of scattering, halation, and other effects for which grainy, particulate screens are objectionable when used in information portrayal systems such as, for example, television and radar.

Despite the above advantages of evaporation as a means of forming luminescent screens, the presently available evaporation techniques have some decided disadvantages. Thus, for example, some excellent phosphor substances which have low vapor pressure may not readily be evaporated without dissociation. Additionally, many substances must first be formed by evaporation, and then subsequently heat-treated, often for long periods of time, before they are rendered luminescent. Finally, since conventional evaporated luminescent films are formed upon a substrate, they are readily subject to cracking, crazing, and peeling, and are often readily separated from the substrate.

Accordingly, one object of the present invention is to provide a method of forming evaporated luminescent screens which are integral with the evaporation substrate.

Another object of the invention is to provide a one-step method for forming evaporated luminescent screens.

Still another object of the invention is to provide a method of forming evaporated films of substances which have low vapor pressures and may not ordinarily be evaporated without dissociation.

A further object of the invention is to provide improved evaporated luminescent screens.

A further object of the invention is to provide improved multi-color evaporated luminescent screens and a method of formation thereof.

In accord with one feature of the present invention, we form transparent luminescent screens of difficultly evaporable complex ion substances such as, for example, zinc silicate, zinc borate, and zinc phosphate, in a simple, one-step process by evaporating a fluoride salt onto a suitable heated glass substrate containing predominantly an oxide of the element which constitutes the central atom of the complex phosphor anion. In the process, the evaporated fluoride salt chemically attacks the predominant oxide of the glass, forming a surface-adjacent region of a luminescent substance comprising the cation of the fluoride salt and an inorganic, oxygen-containing complex ion containing the aforementioned central atom.

The novel features believed characteristic of the present invention are set forth in the appended claims. The invention itself, together with further objects and advantages thereof, may thus be understood with reference to the appended drawing in which Figs. 1 and 2 are cross-sectional views of a typical apparatus with which the present invention may be practiced.

In the drawing, suitable apparatus for performing the present invention includes a long cylindrical bell jar 1 which rests upon a support disk 2 and is vacuum sealed thereto with an O-ring 3. Midway along the length of bell jar 1 there is mounted an annular slotted support ring 4, suitable for supporting a vitreous disk 5 upon which a phosphor layer is to be formed by evaporation. Support ring 4 is shown in elevation in Fig. 2 which is a sectional view taken along the line 2—2 in Fig. 2. A thermocouple 6 is temporarily connected with substrate 5 for measuring the temperature thereof and extends out through a vacuum seal 7 at the upper end of bell jar 1. A pair of conducting support leg members 8 extend upward through suitable vacuum tight, insulating members 9 in support plate 2, and are connected with a suitable source of electrical potential as represented generally by alternating current generator 10 and potentiometer 11. An evaporation boat 12, in this instance, in the form of a tapered inverted coil, is supported between the interior end of conducting members 8. Evaporation boat 12 is adapted to hold a pellet 13 of the substance or substances which is to be evaporated therefrom. A suitable baffle 14 is connected with conducting support members 8 and is shaped to the interior dimension of bell jar 1 to prevent any of the vaporized material of pellet 13 from escaping downwardly from the evaporation boat and into the evacuation exhaust. The entire lateral surface of bell jar 1 from a region substantially below baffle 14 to a region substantially above the position of evaporation substrate 5 is coated with a thin resistive layer 15 which is contacted with a pair of ring electrodes 16 which in turn are connected to a source of potential represented generally by alternating current generator 17 and potentiometer 18. Resistive coating 15 serves as a heater when an electric current is passed therethrough by means of ring electrodes 16, and is the only means by which evaporation substrate 5 is heated in accord with the present invention. This means of heating evaporation substrate 5 is particularly advantageous since it permits operation at high substrate temperatures and prevents material evaporated from evaporation boat 12 from being deposited on the bell jar walls. The disclosed apparatus, particularly with respect to the above-mentioned means of heating, does not constitute a part of the present invention and is disclosed and claimed in my copending application, Serial No. 724,149 filed concurrently herewith and assigned to the assignee of the present invention.

In accord with one feature of my present invention, a transparent evaporated luminescent screen which is integral with the supporting substrate is formed by evaporating from evaporation boat 12 a fluoride salt including the cation of the desired phosphor onto a suitable glass plate composed predominantly of an oxide of the central atom of the complex cation of the phosphor being formed. Thus, for example, if it is desired to form a zinc silicate phosphor, I proceed to evaporate a zinc fluoride salt onto a glass composed predominantly of silica, namely, a silicate glass such as Pyrex glass. If on the other hand, it is desired to form a zinc borate phosphor I evaporate a zinc fluoride onto a glass composed predominantly of boron oxide. Similarly, if it is desired to form a zinc phosphate phosphor, I evaporate a zinc fluoride salt upon a glass composed predominantly of phosphorous oxide.

In these operations, the fluoride salt chemically attacks the predominant oxide of the surface adjacent region of the glass forming a gaseous fluoride, which is pumped free from the system, and a complex ion phosphor composed of the cation of the substance evaporated from the evaporation boat, the central atom of the complexion which predominates in the glass and oxygen. As used herein, the term "composed predominantly of an oxide" shall be construed as meaning that the chosen glass is composed of at least 50 weight percent of the designated oxide.

In forming phosphate layers in accord with the present invention, it is first necessary to determine the phosphor which is desired to be formed. It is then necessary next to choose a glass which has a predominant content of an oxide of the central atom of the complex ion of the phosphor. It is then necessary to select a volatilizable fluoride containing the cation of the phosphor desired to be formed. The substrate is then placed in position upon annular ring 4 within bell jar 1 and a thermocouple attached thereto so that the temperature thereof may be closely regulated. A small pellet containing, for example, from $\frac{1}{10}$ to 1 gram of the chosen fluoride salt is then placed within evaporation boat 12. An activator quantity of a suitable activator for the phosphor which is desired to be formed by the process may conveniently also be formed into the fluoride pellet. Thus, for example, if the fluoride utilized is to be zinc fluoride and the activator utilized is to be manganese, a small quantity of approximately 0.01% to 5% by weight of manganese may be physically mixed with the zinc fluoride powder for the powder is pressed into a pellet. Alternatively, standard zinc fluoride phosphor activated with 0.01 to 5 weight percent of manganese may be utilized and pressed into a pellet. As a third alternative, a thin layer approximately $10^{-2}$ the thickness of the desired phosphor layer of manganese or a suitable manganese salt, as for example, manganese chloride may be sputtered, evaporated, or otherwise deposited upon the substrate prior to evaporation of the zinc fluoride onto the substrate. Other suitable activators which may be used in the same proportions as manganese are titanium, cerium, and lead.

After the suitable fluoride and activator have been placed within evaporation crucible 12, or after the activator in elemental or compound form has been coated upon the substrate and the substrate placed in place and the suitable fluoride placed within the evaporation boat, the bell jar is lowered over the evaporation boat and sealed to the base plate. The volume within bell jar 1 is then evacuated to a suitable low pressure of, for example, less than 10 microns of mercury pressure, by means of a vacuum pump (not shown) attached to vacuum line 19. After a suitable low pressure has been established within the bell jar, the bell jar and evacuation substrate 5 are raised to a suitable temperature by causing electric current to flow through potentiometer 18, ring electrodes 16, and resistive film 15. Film 15 may conveniently be tin oxide film known to the art as "conducting glass" or titanium dioxide. For the purposes of the present invention, the temperature of the evaporation substrate should be at a temperature sufficiently high to stimulate the reaction between the evaporated fluoride and the predominant oxide of which the glass is composed without causing the glass to become soft and deform. For silicate glasses, as for example, Pyrex, Vycor, and other high temperature glasses, this temperature may be from 500° to 700° C. Preferable temperatures in these cases are from approximately 550° to 650° C. For borate and phosphate glasses, the temperature range is from 500° to 600° C. In all cases, the process is operable from approximately 500° C. to the softening point of the glass used.

After the evaporation substrate has reached a suitable temperature, the electric current is supplied through conductive support members 8 to evaporation boat 12 by connecting thereto alternating current source 10. Conveniently, evaporation boat 12 may be a 0.020 inch diameter, 2 inch length wire of platinum so as to be non-reactive with fluoride compound utilized. Conductive support members 8 may conveniently be constructed of tungsten. A current of say, for example, 7 amperes is supplied at a potential of, for example, 7 volts A.C. for a period, of, for example, from 2 to 5 minutes to completely evaporate all of a $\frac{2}{10}$ gram pellet of zinc fluoride upon a 2 inch diameter substrate.

Some of the glasses with which the present invention may be practiced are listed as follows together with their composition and softening points.

Vycor—S/P=1500° C.:

| | Percent |
|---|---|
| $SiO_2$ | 80.5 |
| $B_2O_3$ | 3 |
| $Al_2O_3$ | 0.4 |
| Alkali | 0.6 |

Pyrex #7740—S/P=820° C.:

| | |
|---|---|
| $SiO_2$ | 80.5 |
| $B_2O_3$ | 12.9 |
| $Al_2O_3$ | 2.2 |
| Alkali oxides | 4.2 |

Corning #1710—S/P=915° C.:

| | |
|---|---|
| $SiO_2$ | 57 |
| $Al_2O_3$ | 20.5 |
| MgO | 12 |
| CaO | 5.5 |
| $B_2O_3$ | 4 |
| Alkali | 1 |

Corning FN #7052—S/P=708° C.:

| | |
|---|---|
| $SiO_2$ | 67 |
| $Al_2O_3$ | 7 |
| $B_2O_3$ | 16 |
| Alkali oxides | 7 |
| BaO | 3 |

Navias #1008—S/P=600° C.:

| | |
|---|---|
| $P_2O_5$ | 57 |
| $B_2O_3$ | 10 |
| $Al_2O_3$ | 6 |
| CaO | 8 |
| ZnO | 4 |
| $Na_2O$ | 15 |

Corning #4600—S/P=700° C.: High $P_2O_5$ content; exact composition unknown

Sodium resistant glass—S/P=600° C.:

| | Percent |
|---|---|
| $B_2O_3$ | 66 |
| $SiO_2$ | 5 |
| $Na_2O$ | 6 |
| CaO | 10 |
| $Al_2O_3$ | 13 |

Quartz—S/P=1710° C.:

| | |
|---|---|
| $SiO_2$ | 1000 |

In practicing my invention I have formed zinc silicate phosphors activated with manganese utilizing the following glasses; Vycor, Pyrex, Corning #1710, FN #7052, and quartz.

Similarly, zinc silicate activated with titanium, cerium and lead may be formed upon the same glasses utilizing the same percent (0.01 weight percent to 5 weight percent) of the appropriate activator material together with zinc fluoride in the evaporating boat. Also, cadmium, calcium, magnesium, calcium-magnesium, beryllium, strontium, and zinc-beryllium silicate phosphors activated with manganese, titanium, cerium, or lead may be formed by substituting the corresponding fluoride for zinc fluoride and executing the same manipulative steps.

Zinc phosphate activated with manganese has been formed by evaporating zinc fluoride and manganese from the evaporation boat onto Navias #1008 glass and Corning #4600 (composition not known-high in phosphate content). Similarly, these phosphors may also be formed activated with titanium, cerium, and lead by substituting the appropriate activator for manganese in the evaporation pellet. Also, cadmium, calcium, magnesium, calcium-magnesium, beryllium, strontium, and zinc-beryllium phosphates activated with manganese, titanium, cerium, or lead may be formed by substituting cadmium or calcium fluoride for zinc fluoride and performing the same manipulative steps.

Zinc borate phosphors activated with manganese have been produced integral with the surface of sodium resistant glass as a glaze on Corning #7052 FN glass. Similarly, zinc borate phosphors activated with titanium, cerium and lead may be formed by substituting the appropriate activators for manganese together with zinc fluoride in the evaporation pellet. Also, cadmium borate, calcium, magnesium, calcium-magnesium, beryllium, strontium, and zinc-beryllium silicate phosphors activated with manganese, titanium, cerium, or lead may be made by substituting cadmium fluoride for zinc fluoride and executing the same manipulative steps.

In the practice of my invention, the fluoride salt first attacks the surface of the glass substrate and reacts therewith forming a complex anion phosphor which is integral with the glass substrate and extends a thickness of approximately 2–3 microns thereinto.

While ordinary evaporated complex-ion phosphors such as, for example, zinc silicate activated with manganese, are formed as coatings upon the evaporation substrates and may be removed by scraping, the films formed in accord with the invention are integral and may not be easily removed. Thus, for example, when zinc fluoride is evaporated onto a heated silica glass substrate, the surface of the substrate is actually converted to zinc silicate and has been proven to be such by scratch tests. At distances below the surface of the substrate there exists a solid solution of zinc silicate in silica, the concentration of the former decreasing to zero in a few microns.

The depth of penetration is, therefore, only for a few microns, and once this depth of penetration has been reached, the fluoride salt accumulates in a layer over the substrate and continues to coat the substrate for as long as additional fluoride salt is evaporated thereonto. Since most activated fluorides (as for example, zinc fluoride activated with manganese) are efficient luminescent phosphors, it becomes necessary to remove the fluoride from the surface of the substrate in order that only the integral complex ion phosphor formed by the reaction of the fluoride salt with the glass substrate may be excited by incident cathode rays. If the fluoride salt is not removed, then the presence of the complex-ion phosphor layer, integral with the glass plate, may be detected only if the plate is bombarded with cathode rays of an intensity generally used only to operate multi-layer screens. I have found that the fluoride salts (whether luminescent or non-luminescent) formed by vacuum evaporation in accord with the present invention may be selectively dissolved by certain solvents which do not attack the vitreous substrate and the complex phosphor formed therein and thereupon, thus leaving a clear transparent coating of phosphor which is integral with the substrate and which possesses high luminescent efficiency. In this respect, the zinc fluoride excess layer formed by my evaporation techniques differ from fluoride layers formed by other methods, as for example, the vapor deposition technique disclosed and claimed in U.S. Patent No. 2,789,062 to Cusano and Studer.

I have found that the excess fluoride coating left as a residue in practicing my invention may be readily dissolved by soaking the coated substrate for from 2–20 minutes in a concentrated ammonium hydroxide bath. Other solutions which selectively dissolve fluoride salts but do not dissolve silicate, borate and phosphate and the like may be utilized. Thus, for example, di-sodium versenate, available as an analytical reagent from Bersworth Chemical Company of Framingham, Massachusetts, may also be utilized in the practice of the present invention.

In accord with another feature of the present invention, multi-layer "penetron-type" luminescent screens may be formed. As has been noted hereinbefore, when an activated fluoride, as for example, zinc fluoride activated with manganese, or a fluoride pill containing a mixture of an activating material, as for example, manganese, titanium, cerium, or lead, is evaporated upon a vitreous glass substrate, a portion of the surface-adjacent region of the substrate is chemically attacked forming a complex ion phosphor which is several microns thick as integral with the structure of the substrate. Overlying this several microns thick layer of complex ion phosphor, if the fluoride used is an activated phosphor or has mixed therewith the fluorescence activator, the remainder of the fluoride may be deposited in a luminescent film. There is thus formed a two-layer luminescent structure containing a two different color light emitting luminescent layers. Such a screen, if the dissolution of the flouride step is omitted, may be utilized in a "penetron-type" cathode ray tube wherein different colors are emitted by varying the energy of the incident cathode rays. Thus, it is an additional feature of my invention that the washing with a fluoride solvent step be omitted and the step of evaporating the fluoride salt be continued only long enough to form a first layer integral with the glass substrate and a second thin layer lying thereover, permitting access to the first layer with high energy cathode rays.

As an example of the hereinbefore disclosed feature of my invention, one may evaporate manganese activated zinc fluoride upon a high silicate (Pyrex or Vycor) glass and, omitting the washing with fluoride step, produce a glass substrate having thereon a first, integral layer of zinc silicate which emits green when excited by cathode rays, and a second, non-integral layer of zinc fluoride activated with manganese which emits yellow light when irradiated by cathode rays.

Similarly, two-color films may be produced wherein the first integral layer is any one of the phosphors set forth hereinbefore and the second non-integral layer is of an activated phosphor of the fluoride salt evaporated to form the integral phosphor layer.

While the invention has been set forth hereinbefore in general terms to describe the variation of the many parameters involved, there are set forth hereinafter, specific examples to illustrate those skilled in the art some specific instances in which the invention has been practiced. It is understood that these examples are included for illustrative purposes only and are not to be construed in a limiting sense.

*Example 1.*—A film of zinc silicate activated with manganese approximately two microns thick is formed upon, and integral with, a glass substrate by mounting a two inch diameter ⅛ inch thick Pyrex glass disk upon annular support member 4 of the apparatus of Fig. 1. A compressed 0.25 gram pellet of zinc fluoride activated with 5 weight percent manganese is placed within, and supported by, platinum evaporation boat 12 which is made from 0.020 inch platinum wire. The apparatus is sealed and evacuated to a pressure of less than three microns of mercury. Current is passed through resistive coating 15, which in this instance is a one micron thick layer of tin oxide ($SnO_2$) until the temperature of the Pyrex glass disk rose to 600° C. Seven amperes of alternating current at 7 volts potential was supplied to evaporation boat 12, raising the temperature thereof to approximately 900° C. This temperature was maintained for approximately 3 minutes, during which the entire pill evaporated and the majority thereof deposited upon and reacted with the Pyrex glass. The apparatus was cooled and the disk removed therefrom. The disk was mounted in a demountable cathode ray tube and subjected to 15 kilovolt and 25 kilovolt cathode rays. Under this excitation, the screen luminesced bright yellow and bright green respectively. The disk was then removed and washed in a concentrated ammonium hydroxide solution for approximately 5 minutes. After washing and rinsing the disk was again mounted in a demountable cathode ray tube and subjected to 15 kilovolt cathode rays. The screen under this excitation luminesced bright green.

Example 2.—The apparatus of Fig. 1 was utilized, and a two-inch diameter, ⅛ inch thick disk of Navias #1008 phosphate glass, as described hereinbefore, was mounted therein. A compressed 0.2 grain pellet of zinc fluoride activated with 5 weight percent manganese was mounted in the same evaporation boat described in the previous example. The apparatus was sealed and evacuated to a pressure of less than two microns. The temperature of the glass disk was raised to 550° C. as described in the previous example. Current was applied to the evaporation boat as in the previous example and maintained for two minutes during which the entire pellet evaporated. After cooling, the disk was removed and, before washing, was subjected to 15 and 25 kilovolt cathode ray excitation as described in Example 1 and luminesced yellow and red respectively. The disk was then washed for 20 minutes in concentrated ammonium hydroxide and again tested at 15 kilovolts and luminesced red, the typical color of zinc phosphate activated with manganese.

Example 3.—The apparatus illustrated in Fig. 1 was utilized. A two-inch diameter ⅛ inch thick disk of Corning #7052 FN glass coated with a 25 micron thick glaze of sodium resistant borate glass, as described hereinbefore, was mounted with the glazed surface down in the apparatus. A compressed pellet of 6 weight percent manganese activated zinc fluoride weighing 0.2 gram was placed in the evaporation boat as described in the previous examples, the apparatus was sealed and evacuated to a pressure of less than two microns. The temperature of the glass disk was raised to 550° C. as described in Example 1 and maintained at this temperature. 7.5 amperes alternating current was then passed through the evaporation boat at 7 volts raising the temperature of the evaporation boat to approximately 1,000° C., and the entire pill evaporated in approximately two minutes. The apparatus was demounted and, before washing, the screen exhibited yellow luminescence under 15 kilovolt cathode rays and red under 25 kilovolt cathode rays. After washing for two minutes in concentrated ammonium hydroxide, and rinsing the screen exhibited deep red luminescence at 15 kilovolts characteristic of manganese activated zinc borate.

Example 4.—The apparatus of Fig. 1 was utilized. A two-inch diameter Pyrex glass disk coated with a layer ¼ micron thick of titanium dioxide, formed by spraying titanium tetrachloride over the disk while it was heated to a temperature of approximately 200° C. in a moist atmosphere, was mounted with the titanium dioxide layer downward in the apparatus. A 0.2 gram pellet of technical grade zinc fluoride was placed in the same evaporation boat as described in the previous examples. The apparatus was sealed and evacuated to a pressure of less than one micron of mercury. The Pyrex glass disk was raised to a temperature of 600° C. The temperature of the evaporation boat was raised to approximately 1,000° C., as was described in the previous examples, and maintained at this temperature for approximately two minutes during which the entire pellet evaporated. The Pyrex glass disk was removed and subjected to 15 kilovolt cathode rays under the stimulus of which no luminescence was observed. The disk was then washed in concentrated ammonium hydroxide for 5 minutes and again subjected to 15 kilovolts cathode rays, under which stimulus it luminesced deep blue, the characteristic radiation of titanium activate zinc silicate.

While the invention has been described hereinbefore with respect to specific examples and embodiments, many modifications and changes will immediately become apparent to those skilled in the art. Accordingly, I intend by the appended claims to cover all such modifications and changes as fall within the true spirit and scope of the invention.

What I claim as new and desired to secure by Letters Patent of the United States is:

1. The method of forming a complex-anion oxygen-containing luminescent phosphor integral with a supporting glass substrate which comprises suspending a glass plate within an evacuable reaction chamber; heating the glass plate to a temperature in excess of 500° C. at which the said glass plate will react with a fluoride of the metal which comprises the cation of the desired phosphor but below the temperature at which the glass softens; and vacuum evaporating onto the surface of the glass plate a layer of a fluoride of the metal which comprises the cation of the desired phosphor.

2. The method of forming a complex-ion phosphor comprising a metal, a non-metallic central atom and oxygen integral with a supporting glass substrate which method comprises; suspending a glass containing a predominant amount of an oxide of said non-metallic central atom within an evacuable enclosure; heating the glass to a temperature in excess of 500° C. at which the said glass plate will react with a fluoride of said metal and below the softening point of the glass; and vacuum evaporating upon the heated glass plate a fluoride of said metal.

3. The method of forming a complex-anion oxygen-containing luminescent phosphor integral with a supporting glass substrate which comprises suspending a glass plate within an evacuable reaction chamber; heating the glass plate to a temperature in excess of 500° C. but below the temperature at which the glass softens; vacuum evaporating onto the surface of the glass plate a layer of a flouride of the metal which comprises the cation of the desired phosphor; and washing the glass plate in a solvent for the fluoride to remove all excess flouride therefrom.

4. The method of forming a complex-ion phosphor comprising a metal, a non-metallic central atom and oxygen integral with a supporting glass substrate which method comprises; suspending a glass containing a predominant amount of an oxide of said non-metallic central atom within an evacuable enclosure; heating the glass to a temperature in excess of 500° C. and below the softening point of the glass; vacuum evaporating upon the heated glass plate a fluoride of said metal; and washing the glass plate in a solvent for the fluoride to remove all excess fluoride therefrom.

5. The method of forming a complex-ion luminescent phosphor comprising a metal, a non-metallic central atom and oxygen integral with, and deposited upon, a supporting glass substrate which method comprises; supporting a glass plate within an evacuable reaction chamber, heating the glass plate to a temperature in excess of 500° C. but below the softening point of the glass, and vacuum evaporating upon the surface of the glass plate a layer of a fluoride selected from the group consisting of zinc fluoride, cadmium fluoride, calcium fluoride, magnesium fluoride, calcium-magnesium fluoride, beryllium fluoride, strontium fluoride, and zinc-beryllium fluoride; and 0.01 to 5 weight percent of an activator selected from the group consisting of manganese, cerium, titanium, and lead.

6. The method of forming a complex-ion luminescent phosphor comprising a metal, oxygen and a non-metallic central atom selected from the group consisting of silicon, boron and phosphorus integral with, and deposited upon, a supporting glass substrate which method comprises; supporting a plate of glass selected from the group consisting of silicate, phosphate, and borate glasses within an evacuable reaction chamber, heating the glass plate to a temperature in excess of 500° C. but below the softening point of glass, and vacuum evaporating upon the surface of the glass plate a layer of a fluoride selected from the group consisting of zinc fluoride, cadmium fluoride, calcium fluoride, magnesium fluoride, calcium-magnesium fluoride, beryllium fluoride, strontium fluoride, and zinc-beryllium fluoride; and 0.01 to 5 weight percent of an activator selected from the group consisting of manganese, cerium, titanium, and lead.

7. The method of forming a layer of a silicate phosphor upon, and integral with, a supporting glass plate which method comprises; supporting a predominantly silicate glass plate within an evacuable reaction chamber; heating the glass plate to a temperature in excess of 500° C. and below the softening point of the glass, vacuum evaporating upon the surface of the heated glass plate a fluoride selected from the group consisting of zinc fluoride, cadmium fluoride, calcium fluoride, magnesium fluoride, calcium-magnesium fluoride, beryllium fluoride, strontium fluoride, and zinc-beryllium fluoride, together with 0.01 to 5 weight percent of an activator selected from the group consisting of manganese, titanium, cerium, and lead; cooling the glass plate, and washing the coated plate in a solvent for the fluoride which does not appreciably attack the silicate formed.

8. The method of claim 7 in which the evaporated materials are zinc fluoride and manganese.

9. The method of forming a layer of a phosphate phosphor upon, and integral with, a supporting glass plate which method comprises; supporting a predominately phosphate glass plate within an evacuable reaction chamber; heating the glass plate to a temperature of 500°–600° C. vacuum evaporating upon the surface of the heated glass plate a fluoride selected from the group consisting of zinc fluoride, cadmium fluoride, calcium fluoride, magnesium fluoride, calcium-magnesium fluoride, beryllium fluoride, strontium fluoride, and zinc-beryllium fluoride together with 0.01 to 5 weight percent of an activator selected from the group consisting of manganese, titanium, cerium, and lead; cooling the glass plate, and washing the coated plate in a solvent for the fluoride which does not appreciably attack the phosphate formed.

10. The method of claim 9 in which the evaporated materials are zinc fluoride and manganese.

11. The method of forming a layer of a borate phosphor upon, and integral with, a supporting glass plate which method comprises; supporting a plate of glass having at least a surface portion thereof composed predominately of boron oxide, heating the glass plate to a temperature of from 500 to 600° C., vacuum evaporating upon the surface portion of the heated glass plate a fluoride selected from the group consisting of zinc fluoride, cadmium fluoride, calcium fluoride, magnesium fluoride, calcium-magnesium fluoride, beryllium fluoride, strontium fluoride, and zinc-beryllium fluoride, together with 0.01 to 5 weight percent of a luminescence activator selected from the group consisting of manganese, titanium, cerium and lead; cooling the glass plate, and washing the plate in a solvent for the fluoride which does not appreciably attack the silicate formed.

12. The method of claim 11 in which the evaporated materials are zinc fluoride and manganese.

13. A luminescent screen comprising a glass plate and a luminescent phosphor integral with one surface thereof the interface between said glass plate and said phosphor being a solid solution of glass and phosphor.

14. A luminescent screen comprising an oxide glass plate and a complex ion phosphor composed of a metal and the substance of said oxide, said phosphor being integral with said glass plate, the interface between glass and phosphor being a solid solution of glass phosphor.

15. A penetron-type plural-color luminescent screen comprising a glass plate, a first layer of a first color emitting luminescent phosphor integral with one surface of said glass plate, the interface between said glass plate and said first phosphor being a solid solution of glass and phosphor, and a second layer of a second color-emitting luminescent phosphor overlying said first phosphor layer.

16. A luminescent screen including a glass plate comprising at least 50% by weight of an oxide of a first material selected from the group consisting of silicon, boron and phosphorus, and a layer of a complex ion phosphor including said first material, oxygen and a cation selected from the group consisting of zinc, cadmium, calcium, magnesium, strontium, beryllium, calcium-magnesium, and zinc-beryllium integral with one surface of said glass plate, the interface between said glass and said phosphor being a solid solution of glass and phosphor.

17. The screen of claim 16 in which the first material is silicon and the phosphor is zinc silicate.

18. The screen of claim 16 in which the first material is phosphorous and the phosphor is zinc phosphate.

19. The screen of claim 16 in which the first material is boron and the phosphor is zinc borate.

References Cited in the file of this patent

UNITED STATES PATENTS

| | | |
|---|---|---|
| 2,398,382 | Lyon | Apr. 16, 1946 |
| 2,769,733 | Pool | Nov. 6, 1956 |
| 2,789,062 | Cusano et al. | Apr. 16, 1957 |
| 2,876,129 | Rottgardt | Mar. 3, 1959 |